US010256755B2

(12) United States Patent
Kitano et al.

(10) Patent No.: US 10,256,755 B2
(45) Date of Patent: Apr. 9, 2019

(54) MOTOR DRIVE CONTROLLER AND MOTOR DRIVE CONTROL METHOD

(71) Applicant: MINEBEA MITSUMI INC., Kitasaku-gun, Nagano (JP)

(72) Inventors: Takamichi Kitano, Kakegawa (JP); Katsunori Yamamoto, Iwata (JP)

(73) Assignee: MINEBEA CO., LTD., Nagano (JP)

( * ) Notice: Subject to any disclaimer, the term of this patent is extended or adjusted under 35 U.S.C. 154(b) by 20 days.

(21) Appl. No.: 15/589,311

(22) Filed: May 8, 2017

(65) Prior Publication Data
US 2017/0331413 A1 Nov. 16, 2017

(30) Foreign Application Priority Data

May 13, 2016 (JP) .................................. 2016-097440

(51) Int. Cl.
*H02P 6/17* (2016.01)
*H02P 29/024* (2016.01)
(52) U.S. Cl.
CPC .............. *H02P 6/17* (2016.02); *H02P 29/024* (2013.01)
(58) Field of Classification Search
CPC ...................................................... H02P 31/00
USPC ................................................. 318/490, 34
See application file for complete search history.

(56) References Cited

U.S. PATENT DOCUMENTS

| 8,324,845 B2 * | 12/2012 | Suzuki | ...................... | B25F 5/00 |
| | | | | 318/139 |
| 8,890,449 B2 * | 11/2014 | Suzuki | ...................... | B25F 5/00 |
| | | | | 173/15 |
| 9,270,212 B2 * | 2/2016 | Hollenbeck | ............... | H02P 6/08 |
| 2015/0118037 A1 | 4/2015 | Otsuka et al. | | |

FOREIGN PATENT DOCUMENTS

| JP | 2010-183787 A | 8/2010 |
| JP | 2012-115072 A | 6/2012 |
| JP | 2015-036675 A | 2/2015 |

OTHER PUBLICATIONS

Nov. 6, 2018 Office Action Issued in Japanese Patent Application No. 2016-097440.

* cited by examiner

*Primary Examiner* — David Luo
(74) *Attorney, Agent, or Firm* — Oliff PLC

(57) ABSTRACT

A motor drive controller including a monitoring unit monitoring whether or not a use state of a motor to be controlled satisfies a predetermined condition, and an output information switching unit switching information to be outputted to the outside from an information output path from motor driving information indicating a drive state of the motor to monitoring information indicating the use state if the use state satisfies the predetermined condition.

13 Claims, 8 Drawing Sheets

| NUMBER OF REVOLUTIONS PER MINUTE (rpm) | NUMBER OF REVOLUTIONS PER SECOND |
|---|---|
| 6000 | 100 |
| 3000 | 50 |
| 1000 | 16 |

EXAMPLES
DRIVEN AT 6000 (rpm) FOR ONE HOUR
DRIVEN AT 3000 (rpm) FOR ONE HOUR
DRIVEN AT 1000 (rpm) FOR ONE HOUR

⇩

CUMULATIVE NUMBER OF REVOLUTIONS
100(REVOLUTIONS PER SECOND)×3600(s)
+50(REVOLUTIONS PER SECOND)×3600(s)
+16(REVOLUTIONS PER SECOND)×3600(s)
=597600

FIG.2

| NUMBER OF REVOLUTIONS PER MINUTE (rpm) | NUMBER OF REVOLUTIONS PER SECOND | COEFFICIENT |
|---|---|---|
| 6000 | 100 | 1.5 |
| 3000 | 50 | 1.2 |
| 1000 | 16 | 1.0 |

EXAMPLES
DRIVEN AT 6000 (rpm) FOR ONE HOUR
DRIVEN AT 3000 (rpm) FOR ONE HOUR
DRIVEN AT 1000 (rpm) FOR ONE HOUR CUMULATIVE NUMBER OF REVOLUTIONS
100(REVOLUTIONS PER SECOND)×3600(s)×1.5
+50(REVOLUTIONS PER SECOND)×3600(s)×1.2
+16(REVOLUTIONS PER SECOND)×3600(s)×1.0
=813600

| NUMBER OF REVOLUTIONS PER MINUTE (rpm) | NUMBER OF REVOLUTIONS PER SECOND | COEFFICIENT (40°C) |
|---|---|---|
| 6000 | 100 | 1.7 |
| 3000 | 50 | 1.4 |
| 1000 | 16 | 1.2 |

EXAMPLES
DRIVEN AT 6000 (rpm) FOR ONE HOUR
DRIVEN AT 3000 (rpm) FOR ONE HOUR
DRIVEN AT 1000 (rpm) FOR ONE HOUR

⇩

CUMULATIVE NUMBER OF REVOLUTIONS
100(REVOLUTIONS PER SECOND)×3600(s)×1.7
+50(REVOLUTIONS PER SECOND)×3600(s)×1.4
+16(REVOLUTIONS PER SECOND)×3600(s)×1.2
=933120

FIG.4

| NUMBER OF REVOLUTIONS PER MINUTE (rpm) | COEFFICIENT |
|---|---|
| 6000 | 6.0 |
| 3000 | 3.0 |
| 1000 | 1.0 |

EXAMPLES
DRIVEN AT 6000 (rpm) FOR ONE HOUR
DRIVEN AT 3000 (rpm) FOR ONE HOUR
DRIVEN AT 1000 (rpm) FOR ONE HOUR

⇩

CUMULATIVE OPERATING TIME
1(h)×6.0
+1(h)×3.0
+1(h)×1.0
=10 HOURS

FIG.6

| NUMBER OF REVOLUTIONS PER MINUTE (rpm) | COEFFICIENT (40°C) |
|---|---|
| 6000 | 8.0 |
| 3000 | 4.0 |
| 1000 | 1.3 |

EXAMPLES
DRIVEN AT 6000 (rpm) FOR ONE HOUR
DRIVEN AT 3000 (rpm) FOR ONE HOUR
DRIVEN AT 1000 (rpm) FOR ONE HOUR

⇩

CUMULATIVE OPERATING TIME
1(h)×8.0
+1(h)×4.0
+1(h)×1.3
=13.3 HOURS

FIG.7

MOTOR DRIVE CONTROLLER AND MOTOR DRIVE CONTROL METHOD

CROSS REFERENCE TO RELATED APPLICATIONS

This application claims the benefit of Japanese Patent Application No. 2016-097440, filed May 13, 2016, which is hereby incorporated by reference in its entirety.

BACKGROUND

Technical Field

The present disclosure relates to a motor drive controller and a motor drive control method.

Background Art

A conventional final product using a fan motor as a device needs to undergo maintenance or periodic inspection according to its operating time in consideration of the device-specific failure time and expected life to ensure stable operation. Accordingly, there has been known a motor drive controller which comprises a storage unit that stores various use states of a motor such as a cumulative number of revolutions and a cumulative drive time of the motor, and can directly read the use states of the motor stored in the storage unit by a computer (see Japanese Patent Application Publication No. 2012-115072).

However, the conventional motor drive controller needs an additional computer to read the use states of the motor, and thus it is difficult to simply extract the use states of the motor and to perform maintenance at an appropriate interval during use of the motor.

The present disclosure is related to providing a motor drive controller and a motor drive control method capable of simply extracting a use state of a motor and performing maintenance at an appropriate interval during use of the motor.

SUMMARY

The motor drive controller according to one aspect of the present disclosure comprises: a monitoring unit monitoring whether or not a use state of a motor to be controlled satisfies a predetermined condition; and an output information switching unit switching information to be outputted to the outside from an information output path from motor drive information indicating a drive state of the motor to monitoring information indicating the use state if the use state satisfies the predetermined condition.

This aspect of the present disclosure can simply extract a use state of a motor and can perform maintenance at an appropriate interval during use of the motor.

BRIEF DESCRIPTION OF THE DRAWINGS

FIG. 2 is a view illustrating an example of a method of calculating the cumulative number of revolutions of a motor according to the embodiment;

FIG. 4 is a view illustrating still another example of the method of calculating the cumulative number of revolutions of the motor according to the embodiment;

FIG. 6 is a view illustrating an example of a method of calculating a cumulative operating time of the motor according to the embodiment;

FIG. 7 is a view illustrating another example of a method of calculating a cumulative operating time of the motor according to the embodiment.

DETAILED DESCRIPTION

Hereinafter, a motor drive controller and a motor drive control method according to an embodiment will be described with reference to the accompanying drawings. It should be noted that the present disclosure is not limited to the following embodiments.

Embodiments

Figure 1:
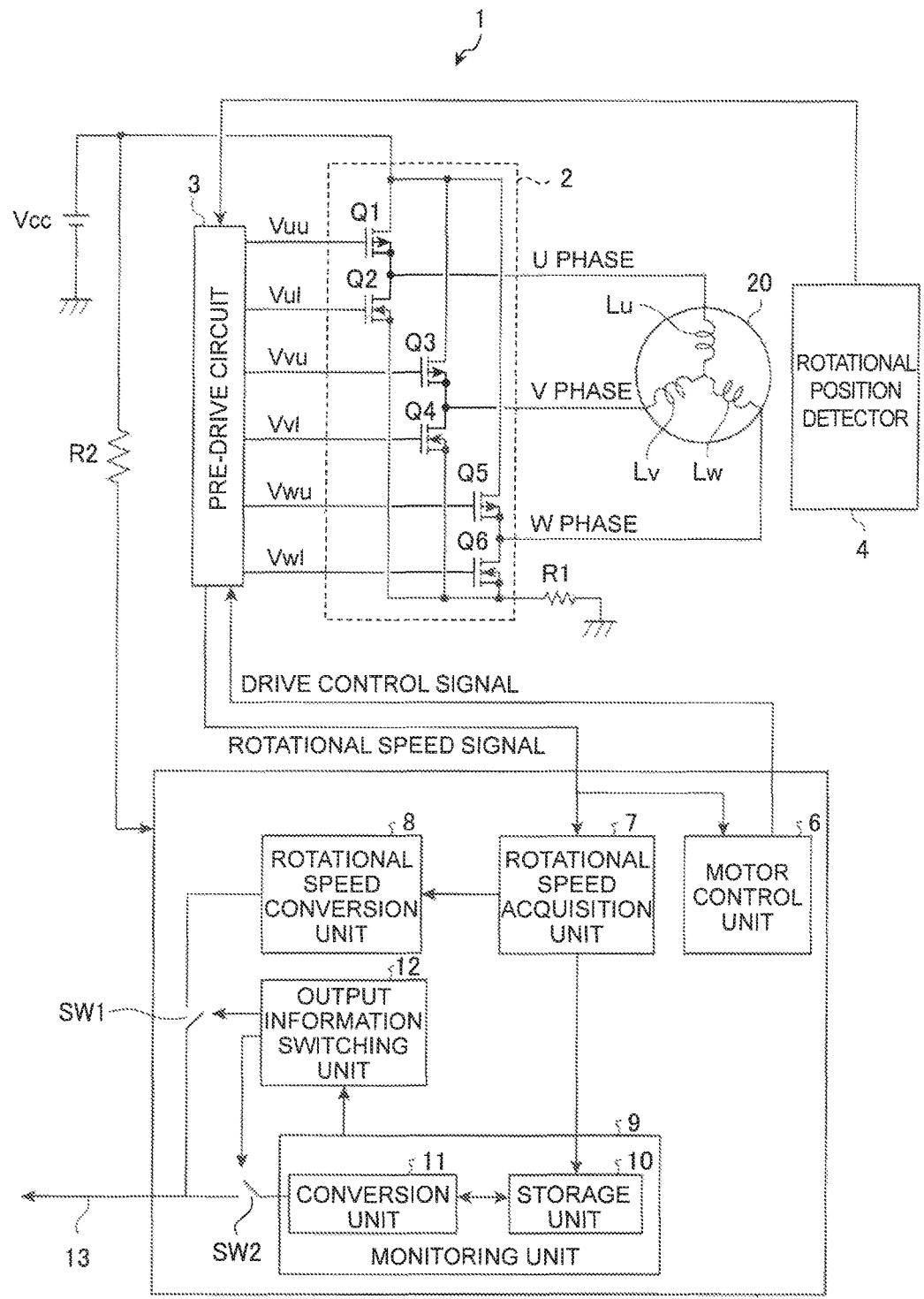
FIG. 1 is a block diagram illustrating a circuit configuration of a motor drive controller according to an embodiment.

FIG. 1 is a block diagram illustrating a circuit configuration of a motor drive controller according to an embodiment.

As illustrated in FIG. 1, a motor drive controller 1 according to the embodiment comprises a monitoring unit 9 and an output information switching unit 12. The monitoring unit 9 monitors whether or not the use states of the motor 20 satisfy a predetermined condition. If the use states of the motor 20 satisfy the predetermined condition, the output information switching unit 12 switches information to be outputted to the outside from an information output path 13 from motor drive information indicating a drive state of the motor 20 to monitoring information indicating the use states.

This embodiment allows the monitoring information based on the use states of the motor 20 to be also extracted from the existing information output path 13 for outputting the motor driving information to the motor 20. Thus, the user can simply extract the use states of the motor 20 and can perform maintenance on the motor 20 at an appropriate interval.

The description will hereinafter focus on the details of the motor drive controller 1 according to the embodiment. The motor drive controller 1 is configured, for example, to drive the motor 20 with a sinusoidal wave. In the embodiment, the motor 20 is, for example, a 3-phase brushless motor such as a fan motor for rotating unillustrated fans. The motor drive controller 1 rotates the motor 20 by applying a sinusoidal drive current to armature coils Lu, Lv, and Lw of the motor 20 based on a rotational position signal of a rotor outputted from a rotational position detector 4.

The motor drive controller 1 comprises an inverter circuit 2, a pre-drive circuit 3, and a control circuit unit 5. Note that the components of the motor drive controller 1 illustrated in FIG. 1 are part of the whole, and the motor drive controller 1 may include not only the components illustrated in FIG. 1 but also other components.

The motor drive controller 1 is an integrated circuit (IC) device packaged in its entirety. Note that some of the motor drive controllers 1 may be packaged as one integrated circuit device, or all or some of the motor drive controllers 1 may be packaged integrally as one integrated circuit device together with other devices.

Based on an output signal outputted from the pre-drive circuit 3, the inverter circuit 2 outputs drive signals to the motor 20 to conduct armature coils Lu, Lv, and Lw of the motor 20. The inverter circuit 2 is configured such that, for example, pairs of series circuits of two switching elements (a pair of switching elements Q1 and Q2, a pair of switching elements Q3 and Q4, and a pair of switching elements Q5 and Q6) provided at both ends of a DC power source Vcc are disposed as coils Lu, Lv, and Lw corresponding to respective phases (U phase, V phase, and W phase). In each pair of two switching elements, a connection point between the two switching elements serves as an output end thereof and the output end is connected to a terminal leading to coils Lu, Lv, and Lw of respective phases of the motor 20. More specifically, the connection point between the switching elements Q1 and Q2 serves as the output end leading to the terminal of the U phase coil Lu. In addition, the connection point between the switching elements Q3 and Q4 serves as the output end leading to the terminal of the V phase coil Lv. In addition, the connection point between the switching elements Q5 and Q6 serves as the output end leading to the terminal of the W phase coil Lw.

Based on control by the control circuit unit 5, the pre-drive circuit 3 generates output signals for driving the inverter circuit 2 and outputs the signals to the inverter circuit 2. Examples of the output signals to be generated include Vuu, Vul, Vvu, Vvl, Vwu, and Vwl corresponding to the respective switching elements Q1 to Q6 of the inverter circuit 2. More specifically, an output signal Vuu is outputted to the switching element Q1 and an output signal Vul is outputted to the switching element Q2. In addition, an output signal Vvu is outputted to the switching element Q3, and an output signal Vvl is outputted to the switching element Q4. Further, an output signal Vwu is outputted to the switching element Q5, and an output signal Vwl is outputted to the switching element Q6. In response to these output signals, the switching elements Q1 to Q6 corresponding to the respective output signals are turned on or off. When turned on, a drive signal is outputted to the motor 20 and power is supplied to the respective phase coils of the motor 20. To stop rotation of the motor 20 all the switching elements Q1 to Q6 are turned off.

In the embodiment, a rotational speed signal is inputted to the control circuit unit 5. More specifically, the rotational speed signal is inputted to the control circuit unit 5 from the rotational position detector 4 installed in the motor 20 via the pre-drive circuit 3. Examples of the rotational speed signal include an FG signal corresponding to rotation of a rotor of the motor 20. In other words, the rotational speed signal refers to rotational speed information indicating a detection result of the number of revolutions of the motor 20. The FG signal may be a signal (pattern FG) generated using a coil pattern provided in a substrate on the rotor side, or may be a signal (Hall FG) generated using an output of a Hall element disposed in the motor 20. Alternatively, a rotational position detection circuit may be provided to detect a counter electromotive voltage induced in phases (U, V, and W phases) of the motor 20, and based on the detected counter electromotive voltage, the rotational position and the number of revolutions of the rotor of the motor 20 may be detected. Still alternatively, a sensor signal of an encoder may be used to detect the number of revolutions of the motor and rotational position thereof.

The control circuit unit 5 comprises a motor control unit 6, a rotational speed acquisition unit 7, a rotational speed conversion unit 8, a monitoring unit 9, an output information switching unit 12, and switches SW1 and SW2. The monitoring unit 9 includes a storage unit 10 and a conversion unit 11. The control circuit unit 5 includes, for example, a microcomputer, a digital circuit, and the like. The drive power is supplied to the control circuit unit 5, for example, by stepping down direct current power source Vcc by a resistor R2.

Based on an unillustrated speed command signal (a clock signal having a frequency corresponding to a target rotational speed) to be set by the user and the rotational speed signal, the motor control unit 6 generates a drive control signal and outputs the generated drive control signal to the pre-drive circuit 3. More specifically, the motor control unit 6 controls rotation of the motor 20 by outputting the drive control signal for driving the motor 20 to the pre-drive circuit 3 while controlling feedback by comparing the target rotational speed and an actual number of revolutions of the motor 20. Based on the drive control signal, the pre-drive circuit 3 generates an output signal for driving the inverter circuit 2 and outputs the signal to the inverter circuit 2.

The rotational speed acquisition unit 7 receives the rotational speed signal from the pre-drive circuit 3 per unit time, and transmits information on the number of revolutions per unit time of the motor 20 based on the rotational speed signal to the rotational speed conversion unit 8 and the storage unit 10 in the monitoring unit 9.

The rotational speed conversion unit 8 converts the information on the number of revolutions per unit time of the motor 20 received from the rotational speed acquisition unit 7 to a predetermined pulse signal which is motor driving information. Then, the rotational speed conversion unit 8 outputs the pulse signal based on the number of revolutions per unit time which is motor driving information from the information output path 13 to outside via the switch SW1. Examples of the information output path 13 include an output terminal (Tach terminal) which outputs the pulse signal based on the motor driving information to the outside while the motor 20 is in operation.

The storage unit 10 stores the use states such as the cumulative number of revolutions of the motor 20 and the cumulative operating time thereof. More specifically, for example, the storage unit 10 multiplies the numbers of revolutions per unit time of the motor 20 received from the rotational speed acquisition unit 7 and calculates and stores the cumulative number of revolutions of the motor 20. Alternatively, based on each number of revolutions per unit time of the motor 20, the storage unit 10 multiplies the operating times for each number of revolutions of the motor 20 and calculates and stores the cumulative operating time from the operating time for each number of revolutions. Further, the storage unit 10 preliminarily stores various setting values for controlling various processes in the monitoring unit 9. Note that the storage unit 10 is a non-volatile memory such as an electrically erasable programmable read-only memory (EEPROM) and thus even if the motor drive controller 1 is in a state of being turned off, the aforementioned use states of the motor 20 and setting information are not erased.

The conversion unit 11 converts the use states of the motor 20 stored in the storage unit 10 to predetermined monitoring information. Examples of the predetermined monitoring information may include a fixed signal which is a constant output value, a predetermined pulse signal which has a predetermined frequency, and a serial information pulse signal. If the use states of the motor 20 satisfy a predetermined condition, the conversion unit 11 outputs the monitoring information from the information output path 13 to outside via the switch SW2.

The monitoring unit 9 periodically monitors whether or not the use states of the motor 20 stored in the storage unit 10 satisfy the predetermined condition. Examples of the predetermined condition include a guaranteed number of revolutions and a guaranteed operating time set based on one or both of the types and specifications of the motor 20, which are preliminarily stored in the storage unit 10. The monitoring unit 9 determines that the predetermined condition is satisfied if the cumulative number of revolutions of the motor 20 is equal to or greater than the guaranteed number of revolutions and if the cumulative operating time of the motor 20 is equal to or greater than the guaranteed operating time, or if one or both of the above conditions are satisfied. If the predetermined condition is determined to be satisfied, the monitoring unit 9 notifies the output information switching unit 12 that the use states of the motor 20 satisfy the predetermined condition.

If the monitoring unit 9 determines that the use states of the motor 20 satisfy the predetermined condition, the output information switching unit 12 controls the switches SW1 and SW2 to switch the information to be outputted to the outside from the information output path 13 from the motor driving information generated by the rotational speed conversion unit 8 to the monitoring information generated by the conversion unit 11.

More specifically, if the use conditions of the motor 20 are determined not to satisfy the predetermined condition, the output information switching unit 12 connects the switch SW1 and disconnects the switch SW2. Then, the motor driving information generated by the rotational speed conversion unit 8 is outputted from the information output path 13. Meanwhile, if the use conditions of the motor 20 are determined to satisfy the predetermined condition, the output information switching unit 12 disconnects the switch SW1 and connects the switch SW2. Then, the monitoring information generated by the conversion unit 11 is outputted from the information output path 13.

According to the above described motor drive controller 1, even while the motor 20 is in operation, if the use states satisfy the predetermined condition, the monitoring information can be outputted from the existing information output path 13 (Tach terminal). Therefore, the user of the motor 20 can obtain the monitoring information on the motor 20 simply by monitoring the states of the normally used Tach terminal, and thus can perform simple and easy-to-use monitoring on the motor 20.

The monitoring information can be outputted from the existing information output path 13, the use of which eliminates the need to prepare a dedicated port for outputting the monitoring information. Therefore, the motor drive controller 1 has the advantages of eliminating the need to add wirings or change circuits and being free from space restrictions.

Further, the motor drive controller 1 can automatically inform the user of the maintenance time of the motor 20, and thus the user can perform maintenance on the motor 20 in a timely manner.

FIG. 2 is a view illustrating an example of a method of calculating the cumulative number of revolutions of a motor according to the embodiment. For example, when the number of revolutions of the motor 20 (see FIG. 1) is 6000 rpm), the number of revolutions per second is 100; when the number of revolutions of the motor 20 is 3000 (rpm), the number of revolutions per second is 50; and when the number of revolutions of the motor 20 is 1000 (rpm), the number of revolutions per second is 16 (rounded down).

In light of this, for example, when the motor 20 is driven at 6000 (rpm) for one hour, at 3000 (rpm) for one hour, and at 1000 (rpm) for one hour, the storage unit 10 (see FIG. 1) can calculate that the cumulative number of revolutions of the motor 20 is 597600. Then, the monitoring unit 9 (see FIG. 1) can determine whether or not the use states of the motor 20 satisfy the predetermined condition by comparing the thus calculated cumulative number of revolutions of the motor 20 with a predetermined guaranteed number of revolutions.

Figure 3:
FIG. 3 is a view illustrating another example of the method of calculating the cumulative number of revolutions of the motor according to the embodiment.

FIG. 3 is a view illustrating another example of the method of calculating the cumulative number of revolutions of the motor according to the embodiment. The load on the motor 20 changes according to the difference in the number of revolutions per unit time of the motor 20 (see FIG. 1). Thus, FIG. 3 illustrates the example in which the differences in the number of revolutions per unit time are preliminarily weighted with coefficients.

For example, in the case in which the motor 20 is installed at room temperature (for example, 25° C.), the numbers of revolutions of the motor 20 ranging from 3000 to 6000 (rpm) are weighted with a coefficient of 1.5, the numbers of revolutions of the motor 20 ranging from 1000 to 3000 (rpm) are weighted with a coefficient of 1.2, and the numbers of revolutions of the motor 20 ranging from 0 to 1000 (rpm) are weighted with a coefficient of 1.0. Then, as in FIG. 2, when the motor 20 is driven at 6000 (rpm) for one hour, at 3000 (rpm) for one hour, and at 1000 (rpm) for one hour, the storage unit 10 (see FIG. 1) can calculate that the cumulative number of revolutions of the motor 20 is 813600.

As illustrated in FIG. 3, maintenance can be performed on the motor 20 at a more accurate interval by weighting the cumulative number of revolutions as an example of the use states of the motor 20 with coefficients based on the number of revolutions than by monitoring the use states of the motor 20 based on simple cumulative numbers of revolutions.

FIG. 4 is a view illustrating still another example of the method of calculating the cumulative number of revolutions of the motor according to the embodiment. The load on the motor 20 further changes according to the difference in the use environment of the motor 20 (see FIG. 1). Thus, FIG. 4 illustrates the example in which the coefficients are weighted considering the differences based on the use environment.

For example, in the case in which the motor 20 is installed at a temperature of 40(° C.), the numbers of revolutions of the motor 20 ranging from 3000 to 6000 (rpm) are weighted with a coefficient of 1.7, the numbers of revolutions of the motor 20 ranging from 1000 to 3000 (rpm) are weighted with a coefficient of 1.4, and the numbers of revolutions of the motor 20 ranging from 0 to 1000 (rpm) are weighted with a coefficient of 1.2. Then, like the FIG. 2, when the motor 20 is driven at 6000 (rpm) for one hour, at 3000 (rpm) for one hour, and at 1000 (rpm) for one hour, the storage unit 10 (see FIG. 1) can calculate that the cumulative number of revolutions of the motor 20 is 933120.

Note that the above-described resolution of the coefficient is an example and can be arbitrarily set. For example, a different coefficient may be set every 100 rpm, or may be set by a function (coefficient=f (x)) having the number of revolutions (x) as a variable.

The coefficient according to the embodiment may be preliminarily set based on not only the temperature of the installation place of the motor 20 illustrated in FIG. 4, but also the humidity of the installation place of the motor 20, and the atmospheric pressure and the like of the installation location of the motor 20. The set coefficient is preliminarily stored in the storage unit 10. Alternatively, temperature information, humidity information, atmospheric pressure information, and the like may be acquired from a separately installed temperature sensor, humidity sensor, atmospheric pressure sensor, and the like to dynamically change the coefficient based on the various information obtained as described above.

As illustrated in FIG. 4, maintenance can be performed on the motor 20 at a further more accurate interval by weighting with the coefficients considering the differences based on the use environment of the motor 20 than by monitoring the use states of the motor 20 by weighting the cumulative numbers of revolutions only with the coefficients based on the numbers of revolutions.

Figure 5:
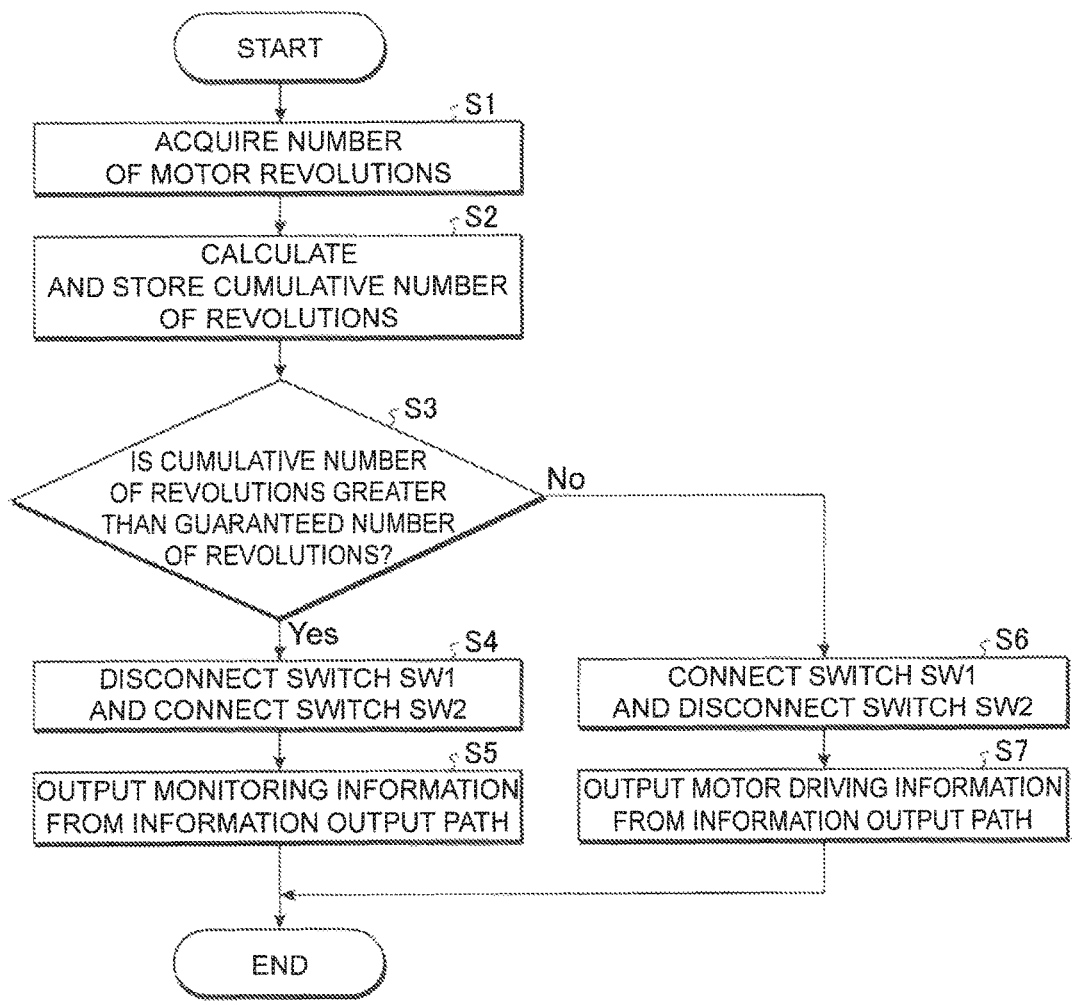
FIG. 5 is a flowchart illustrating a process flow of the motor drive controller according to the embodiment.

FIG. 5 is a flowchart illustrating a process flow of the motor drive controller 1 according to the embodiment. The rotational speed acquisition unit 7 (see FIG. 1) receives a rotational speed signal from the pre-drive circuit 3 (see FIG. 1), acquires the number of revolutions per unit time of the motor 20 (see FIG. 1) (Step S1), and then transmits the acquired number of revolutions per unit time to the storage unit 10 in the monitoring unit 9 (see FIG. 1). Then, the storage unit 10 multiplies the drive time for each number of revolutions to the number of revolutions per unit time, or as needed, multiplies by multiplying the number of revolutions per unit time by the drive time for each number of revolutions and the coefficient. Then, based on the accumulation, the storage unit 10 calculates the cumulative number of revolutions of the motor 20 and stores the cumulative number of revolutions as a use state (Step S2).

Then, the monitoring unit 9 compares the cumulative number of revolutions of the motor 20 with a predetermined guaranteed number of revolutions (Step S3). If the cumulative number of revolutions is greater than the guaranteed number of revolutions (Yes in Step S3), the output information switching unit 12 (see FIG. 1) disconnects the switch SW1 and connects the switch SW2 (Step S4). As a result, the monitoring information generated by the conversion unit 11 of the monitoring unit 9 (see FIG. 1) is outputted to the outside from the information output path 13 (see FIG. 1) (Step S5), and the process ends.

Meanwhile, if the cumulative number of revolutions is not greater than the guaranteed number of revolutions (No in Step S3), the output information switching unit 12 connects the switch SW1 and disconnects the switch SW2 (Step S6). As a result, the motor driving information generated by the rotational speed conversion unit 8 (see FIG. 1) is outputted to the outside from the information output path 13 (Step S7), and the process ends. Note that the process flow according to the embodiment illustrated in FIG. 5 is performed periodically (for example, every second).

Then, the description will move on to the case of using the cumulative operating time of the motor 20 as a use state of the motor 20. FIG. 6 is a view illustrating a method of calculating the cumulative operating time of the motor according to the embodiment.

As illustrated in FIG. 3, the load on the motor 20 changes according to the difference in the number of revolutions of the motor 20 (see FIG. 1). When the operating time is multiplied for each number of revolutions, the load on the motor 20 differs depending on a difference in number of revolutions even with the same operating time. Therefore, in FIG. 6, the coefficients are preliminarily set for each number of revolutions for weighting.

For example, in the case in which the motor 20 is installed at room temperature (for example, 25° C.), the numbers of revolutions of the motor 20 ranging from 3000 to 6000 (rpm) are weighted with a coefficient of 6.0, the numbers of revolutions of the motor 20 ranging from 1000 to 3000 (rpm) are weighted with a coefficient of 3.0, and the numbers of revolutions of the motor 20 ranging from 0 to 1000 (rpm) are weighted with a coefficient of 1.0. Then, when the motor 20 is driven at 6000 (rpm) for one hour, at 3000 (rpm) for one hour, and at 1000 (rpm) for one hour, the storage unit 10 (see FIG. 1) can calculate that the cumulative operating time of the motor 20 is 10 hours.

FIG. 7 is a view illustrating another example of a method of calculating a cumulative operating time of the motor according to the embodiment. As illustrated in FIG. 4, the load on the motor 20 further changes according to the difference in the use environment of the motor 20 (see FIG. 1). Thus, FIG. 7 illustrates the example in which the coefficients are weighted considering the differences based on the use environment.

For example, in the case in which the motor 20 is installed at a temperature of 40(° C.), the numbers of revolutions of the motor 20 ranging from 3000 to 6000 (rpm) are weighted with a coefficient of 8.0, the numbers of revolutions of the motor 20 ranging from 1000 to 3000 (rpm) are weighted with a coefficient of 4.0, and the numbers of revolutions of the motor 20 ranging from 0 to 1000 (rpm) are weighted with a coefficient of 1.3. Then, as in FIG. 6, when the motor 20 is driven at 6000 (rpm) for one hour, at 3000 (rpm) for one hour, and at 1000 (rpm) for one hour, the storage unit 10 (see FIG. 1) can calculate that the cumulative operating time of the motor 20 is 13.3 hours.

Note that the above-described resolution of the coefficient is an example and can be arbitrarily set. For example, the coefficient may be set to change every 100 rpm, or may be set by a function (coefficient=f (x)) having the number of revolutions (x) as a variable.

The coefficient according to the embodiment may be preliminarily set based on not only the temperature of an installation place of the motor 20 illustrated in FIG. 7, but also the humidity of the installation place of the motor 20, and the atmospheric pressure and the like of the installation place of the motor 20. The coefficients for use in calculating the cumulative number of revolutions and the coefficients for use in calculating the cumulative operating time may be set based on different standards. For example, the coefficients for use in calculating the cumulative number of revolutions may be set to change every 100 rpm and the coefficients for use in calculating the cumulative operating time may be set by a function (coefficient=f (x)) having the number of revolutions (x) as a variable.

Figure 8:
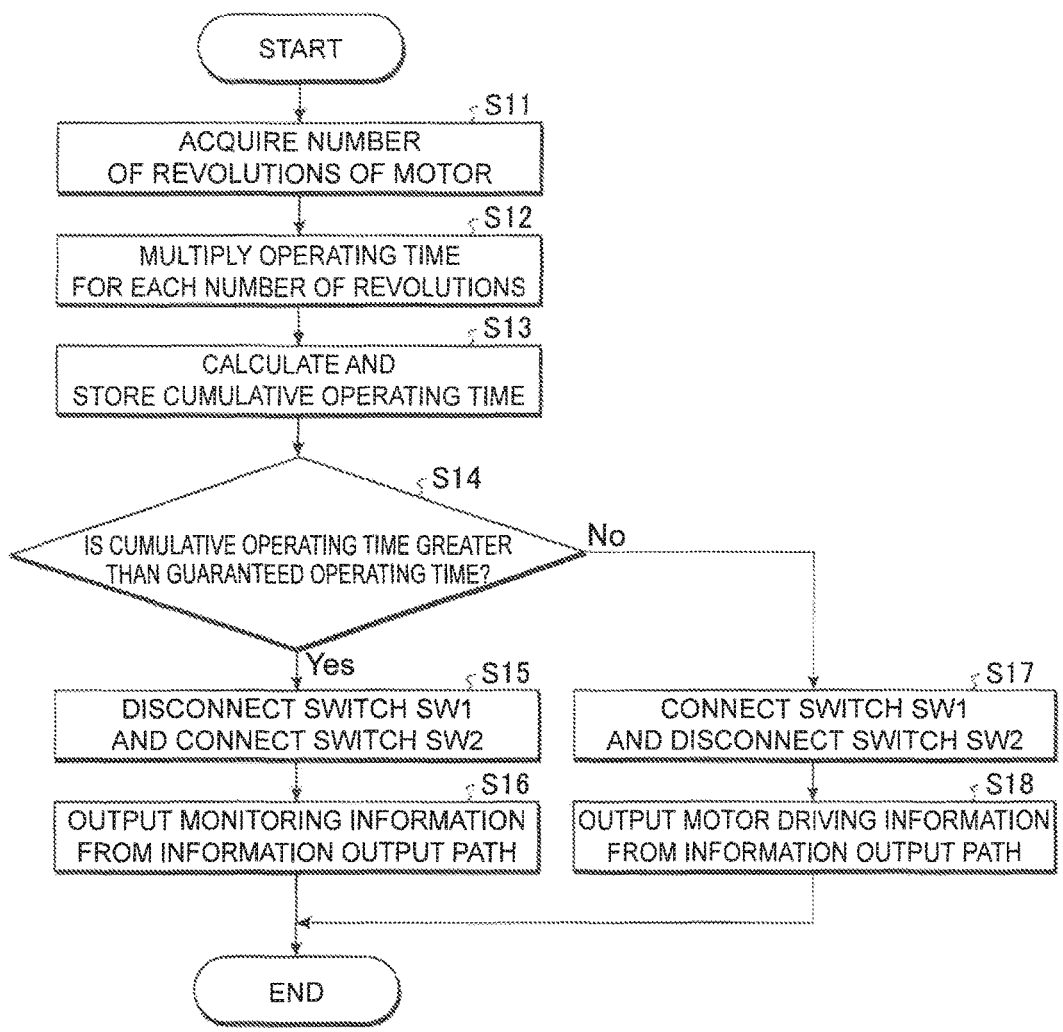
FIG. 8 is a flowchart illustrating another process flow of the motor drive controller according to the embodiment.

FIG. 8 is a flowchart illustrating another process flow of the motor drive controller 1 according to the embodiment. The rotational speed acquisition unit 7 (see FIG. 1) receives the rotational speed signal from the pre-drive circuit 3 (see FIG. 1), acquires the number of revolutions per unit time of the motor 20 (see FIG. 1) (Step S11), and transmits the acquired number of revolutions per unit time to the storage unit 10 in the monitoring unit 9 (see FIG. 1). Then, the storage unit 10 multiplies the number of revolutions per unit time by the operating time for each number of revolutions (Step S12). Then, the storage unit 10 accumulates the operating time for each number of revolutions multiplied by the coefficients, calculates the cumulative operating time of the motor 20 based on the accumulation, and stores the cumulative operating time as a use state (Step S13).

Then, the monitoring unit 9 compares the cumulative operating time of the motor 20 with the predetermined guaranteed operating time (Step S14). If the cumulative operating time is greater than the guaranteed operating time (Yes in Step S14), the output information switching unit 12

(see FIG. 1) disconnects the switch SW1 and connects the switch SW2 (Step S15). As a result, the monitoring information generated by the conversion unit 11 in the monitoring unit 9 (see FIG. 1) is outputted to the outside from the information output path 13 (see FIG. 1) (Step S16), and the process ends.

As the monitoring information to be outputted from the information output path 13 if the cumulative operating time is greater than the guaranteed operating time in operation of motor 20, for example, a fixed signal fixed to a high level (for example, 5(V)) may be used. Alternatively, as another type of monitoring information, for example, monitoring information converted to a predetermined pulse signal indicating the number of revolutions (for example, 8000 (rpm)) equal to or greater than the upper limit (for example, 7000 (rpm)) of the number of revolutions of the motor 20 may be used.

As still another type of monitoring information, if the motor 20 is in an operation start state or in an operation ready state, a fixed signal, a predetermined pulse signal, or a serial information pulse signal including a specific cumulative number of revolutions (for example, 10 million revolutions) and a cumulative operating time (for example, 60,000 hours) may be transmitted outside as detailed monitoring information. If the motor 20 is in an operation start state or in an operation ready state, the user does not always need the motor drive information itself on the motor 20. Therefore, if the user can obtain a specific cumulative number of revolutions of the motor 20 and the cumulative operating time thereof by a fixed signal, a predetermined pulse signal, or a serial information pulse signal using this grace period, the user can perform maintenance on the motor 20 in a timely manner.

Furthermore, if the motor 20 is in an operation start state or in an operation ready state, a serial information pulse signal including a specific cumulative number of revolutions and the cumulative operating time thereof may be converted to a predetermined pulse signal indicating a predetermined number of revolutions to be outputted to the outside as another type of monitoring information. For example, if the cumulative operating time reaches 60,000 (hours), the serial information pulse signal is converted to a predetermined pulse signal indicating 6500 (rpm) and then the predetermined pulse signal is outputted to the outside. Thus, the user can obtain the monitoring information on the cumulative operating time.

A correspondence between the serial information pulse signal and the predetermined pulse signal is stored as a table, for example, in the storage unit 10. The conversion unit 11 generates the monitoring information by referring to this table. The user at the output destination also has this table, and can obtain the cumulative number of revolutions and the cumulative operating time from the number of revolutions in the operation start state or in the operation ready state. Note that the cumulative number of revolutions and the cumulative operating time obtainable by the user may be weighted with the above described coefficient or may not be weighted with the above described coefficient.

Meanwhile, if the cumulative operating time is not greater than the guaranteed operating time (No in Step S14), the output information switching unit 12 connects the switch SW1 and disconnects the switch SW2 (Step S17). As a result, the motor driving information generated by the rotational speed conversion unit 8 (see FIG. 1) is outputted to the outside from the information output path 13 (Step S18), and the process ends. Note that the process flow according to the embodiment illustrated in FIG. 8 is periodically performed (for example, every millisecond).

As described above, according to the embodiment, the user of the motor 20 can obtain the monitoring information on the motor 20 simply by monitoring the state of the normally used Tach terminal, and thus can perform simple and easy-to-use monitoring on the motor 20. The monitoring information can be outputted from the existing information output path 13, the use of which eliminates the need to prepare a dedicated port for outputting the monitoring information. Therefore, the embodiment has advantages of eliminating the need to add wirings or change circuits and being free from space restrictions. Further, the embodiment can automatically inform the user of the maintenance time of the motor 20, and thus the user can perform maintenance on the motor 20 in a timely manner. Furthermore, the embodiment allows maintenance to be performed on the motor 20 at a more accurate interval by weighting the use states of the motor 20 with coefficients.

Note that the guaranteed number of revolutions or the guaranteed operating time described in the above embodiments can be arbitrarily set. For example, the guaranteed number of revolutions or the guaranteed operating time can be set based on a specified value corresponding to the interval of periodic inspection, a specified value corresponding to the interval of motor replacement, a value based on the absolute maximum rating of the motor, and other values.

Note that the above embodiments have described an example of using a Tach terminal as the information output path 13, but any usable existing terminal other than the Tach terminal may be used. Note also that the values of the coefficients in the above embodiments are only an example, and any values can be set.

Note that the above embodiments have described an example of using a 3-phase brushless motor as the motor 20, but any type of motor may be used as long as the motor is controlled by a microcomputer and can communicate with the outside through the microcomputer.

Note that the above embodiments have described an example of using output information switching unit 12 to switch between the switch SW1 and the switch SW2, but the switching between the switch SW1 and the switch SW2 is not necessary as long as the same process can be performed in the microcomputer. Note also that the method of detecting the number of revolutions by the rotational position detector 4 is not particularly limited, but either a method that utilizes a sensor or a sensorless method may be used.

It should be noted that the present disclosure is not limited to the above embodiments. The present disclosure also includes any structure in which the above components are appropriately combined. Further effects and modifications can be easily derived by those skilled in the art. Therefore, wider aspects of the present disclosure are not limited by the above embodiments and thus various modifications can made thereto.

What is claimed is:
1. A motor drive controller comprising:
 a monitoring unit monitoring whether or not a use state of a motor to be controlled satisfies a predetermined condition, the use state of the motor representing cumulative information indicating an extent to which the motor has been used; and
 an output information switching unit switching information to be outputted to an outside of the motor drive controller from an information output path from motor driving information indicating a drive state of the motor to monitoring information indicating the use state if the use state satisfies the predetermined condition.

2. The motor drive controller according to claim 1, wherein the monitoring unit comprises:
a storage unit storing the use state; and
a conversion unit converting the use state to the monitoring information.

3. The motor drive controller according to claim 2, wherein
the storage unit stores one or both of a cumulative number of revolutions of the motor and a cumulative operating time of the motor as the use state.

4. The motor drive controller according to claim 3, wherein:
one or both of a predetermined guaranteed number of revolutions and a guaranteed operating time are set based on one or both of a type and a specification of the motor; and
the monitoring unit determines that the predetermined condition is satisfied (i) if the cumulative number of revolutions is equal to or greater than the guaranteed number of revolutions and (ii) if the cumulative operating time is equal to or greater than the guaranteed operating time, or if at least one of the above conditions (i) and (ii) is satisfied.

5. The motor drive controller according to claim 4, wherein
the storage unit stores the cumulative number of revolutions calculated based on values obtained by multiplying a number of revolutions per unit time by a coefficient preliminarily set based on the number of revolutions per unit time of the motor as the use state.

6. The motor drive controller according to claim 5, wherein
the storage unit stores the number of revolutions per unit time of the motor and a coefficient preliminarily set based on an use environment of the motor as the coefficient.

7. The motor drive controller according to claim 6, wherein
the storage unit stores the number of revolutions per unit time of the motor and a coefficient preliminarily set based on at least one of a temperature of an installation location of the motor, a humidity of an installation location of the motor, and an atmospheric pressure of an installation location of the motor as the coefficient.

8. The motor drive controller according to claim 4, wherein
the storage unit stores the cumulative operating time calculated based on values obtained by multiplying an operating time per unit time by a coefficient preliminarily set based on a number of revolutions per unit time of the motor as the use state.

9. The motor drive controller according to claim 8, wherein
the storage unit stores the number of revolutions per unit time of the motor and a coefficient preliminarily set based on an use environment of the motor as the coefficient.

10. The motor drive controller according to claim 9, wherein
the storage unit stores the number of revolutions per unit time of the motor and a coefficient preliminarily set based on at least one of a temperature of an installation location of the motor, a humidity of an installation location of the motor, and an atmospheric pressure of an installation location of the motor as the coefficient.

11. The motor drive controller according to claim 2, wherein
the motor drive information is a pulse signal based on the number of revolutions per unit time of the motor,
the conversion unit converts the use state to at least one of a fixed signal which is a constant output value, a predetermined pulse signal which has a predetermined frequency, and a serial information pulse signal as the monitoring information.

12. The motor drive controller according to claim 11, wherein
while the motor is in operation, the conversion unit converts the use state to the fixed signal or the predetermined pulse signal as the monitoring information; and
while the motor is in operation start state or in operation ready state, the conversion unit converts the use state to any one of the fixed signal, the predetermined pulse signal, and the serial information pulse signal as the monitoring information.

13. A motor drive control method of controlling a motor, the method comprising:
a step of monitoring whether or not a use state of a motor to be controlled satisfies a predetermined condition, the use state of the motor representing cumulative information indicating an extent to which the motor has been used; and
a step of switching information to be outputted to an outside of a motor drive controller from an information output path from motor driving information indicating a drive state of the motor to monitoring information indicating the use state if the use state satisfies the predetermined condition.

* * * * *